United States Patent [19]
Furlani et al.

[11] Patent Number: 5,619,479
[45] Date of Patent: Apr. 8, 1997

[54] TRANSLATIONAL BIAS-FIELD DEVICE FOR A MAGNETO-OPTICAL SYSTEM

[75] Inventors: Edward P. Furlani, Lancaster; Bijan Barzideh, Rush; Svetlana Reznik, Rochester; Christopher C. Williams, Rochester; Charles E. Brugger, Rochester, all of N.Y.

[73] Assignee: Eastman Kodak Company, Rochester, N.Y.

[21] Appl. No.: 583,164

[22] Filed: Jan. 4, 1996

[51] Int. Cl.$^6$ ................................................. C11B 11/00
[52] U.S. Cl. ........................................... 369/13; 360/114
[58] Field of Search .............................. 369/13; 360/114, 360/103, 102, 46, 59

[56] References Cited

U.S. PATENT DOCUMENTS 4,972,337  11/1990  Eguchi et al. ........................ 369/13
4,984,226   1/1991  Kobori ................................... 369/13
5,020,042   5/1991  Fearnside et al. .................... 369/13
5,291,345   3/1994  Umeda et al. ....................... 360/59
5,490,124   2/1996  Oliver et al. ........................ 369/13

Primary Examiner—Tan Dinh
Attorney, Agent, or Firm—Peyton C. Watkins

[57] ABSTRACT

A translational, bias-field device for a magneto-optical system having a magneto-optical recording element moving through a first magnetic field created by the bias-field device so that information can be selectively recorded on or erased from the recording element, the device comprises a housing. Two bars are positioned in a spaced apart relationship, disposed substantially parallel to each other and supported by the housing. A permanent magnet is positioned adjacent the recording element for providing the first magnetic field to the recording element, and is attached to the bars which induce translational movement to the magnet when the magnet is induced with a second magnetic field. A coil is positioned adjacent to the magnet which, when energized, imparts the second magnetic field to the permanent magnet.

6 Claims, 2 Drawing Sheets

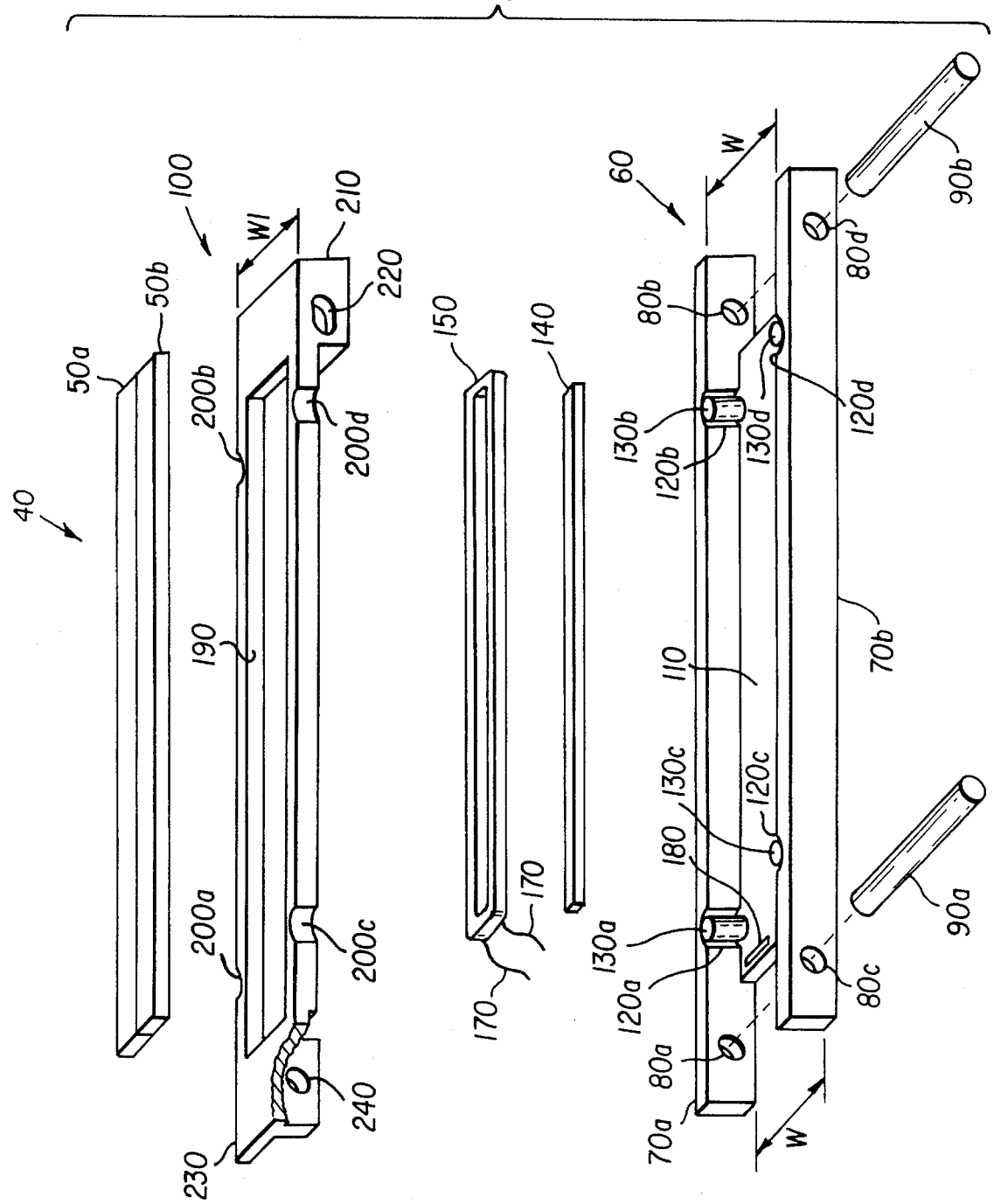

TRANSLATIONAL BIAS-FIELD DEVICE FOR A MAGNETO-OPTICAL SYSTEM

CROSS-REFERENCE TO RELATED APPLICATIONS

The present application is related to U.S. application Ser. No. 08/419,574, filed Apr. 10, 1995, by Edward P. Furlani et al., and entitled, "A PERMANENT MAGNET DEVICE FOR SELECTIVELY INVERTING A MAGNETIC BIAS FIELD FOR MAGNETO-OPTIC RECORDING".

FIELD OF THE INVENTION

The invention relates generally to the field of magneto-optic recording and erasing and, more particularly, to such recording and erasing utilizing a translational, bias-field device for inverting a bias field for permitting recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. One pole of the magnet is placed adjacent the recording medium for inducing its particular magnetization to the recording medium, and when the coil is energized, the field that the coil creates imparts a torque to the magnet forcing it to rotate for causing the other pole of the magnet to be adjacent the recording medium.

Although the presently known and utilized device is satisfactory, it is not without drawbacks. Rotation of the magnet requires it to be accurately positioned so that the proper pole is adjacent the recording medium, and so that the desired pole does not over-rotate or under-rotate causing the desired pole to be positioned non-perpendicular to the recording medium, which reduces the magnetic strength of the bias field. In addition, improvements, such as response time of the magnetic field inversion, are always desirable.

Consequently, a need exists in the construction and mode of operating the bias-field device so as to overcome the above-described drawbacks.

SUMMARY OF THE INVENTION

It is an object of the present invention to provide a bias-field device having accurate pole positioning and a fast response time.

It is an advantage of the present invention to provide a bias-field device which is efficient to produce.

It is a feature of the present invention to provide a permanent magnet positioned adjacent the recording element for providing the magnetic field to the recording element, and attached to two rails which enable translational movement to the magnet when the magnet is induced with another magnetic field.

The present invention is directed to overcoming one or more of the problems set forth above. Briefly summarized according to one aspect of the invention, the invention resides in a translational, bias-field device for a magneto-optical system having a magneto-optical recording element moving through a first magnetic field created by the bias-field device so that information can be selectively recorded on or erased from the recording element, the device comprises (a) a housing; (b) means for providing translational movement attached to said housing; (c) a permanent magnet positioned adjacent the recording element for providing the first magnetic field to the recording element, and attached to said translational means which induce translational movement to said magnet when said magnet is induced with a second magnetic field; and (d) a coil positioned adjacent to said magnet which, when energized, imparts the second magnetic field to said permanent magnet.

The above and other objects of the present invention will become more apparent when taken in conjunction with the following description and drawings wherein identical reference numerals have been used, where possible, to designate identical elements that are common to the figures.

BRIEF DESCRIPTION OF THE DRAWINGS

FIG. 2 is a perspective view of the bias-field device illustrating its assembly.

DETAILED DESCRIPTION OF THE INVENTION

Figure 1:
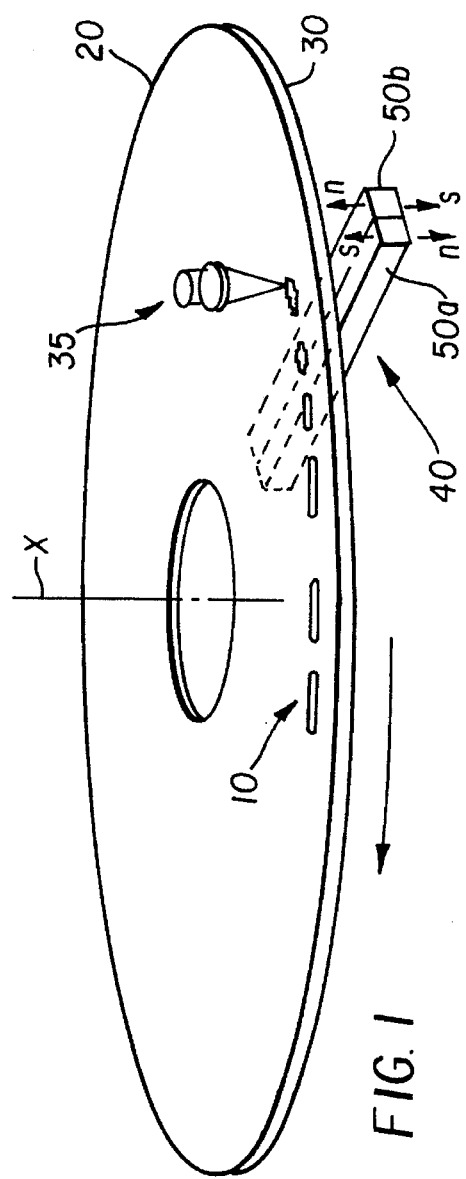
FIG. 1 is a perspective view of a recording medium having the bias-field device of the present invention.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 40 includes two abutting, rectangular-shaped magnets 50a and 50b both having north and south poles oriented along their cross-sectional dimension, and is radially disposed with respect to the rotating disk 10 for providing a magnetic bias-field at recording layer 20. The magnets 50a and 50b are mounted for translational movement, as will be described in detail below, so that the direction of the field under the desired location on the recording medium 10 may be switched from the downward direction in which magnet 50a is beneath the write/erase spot on recording layer 20 to an upward direction in which the bias-field device 40 is translationally moved so that magnet 50b is beneath the write/erase spot on recording layer 20. The magnets 50a and 50b will cause magnetic domains in the recording element to flip orientations, e.g., from upward to downward, whenever the laser beam intensity is at its high level. In this manner, the digital information provided by the laser source 35 is magnetically recorded in the recording layer 20.

To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Referring to FIG. 2, the bias-field device 40 is shown in detail. The device 40 includes a housing 60 having two metallic sides 70a and 70b positioned in a substantially parallel, spaced-apart relationship. Each side 70a and 70b contains two spaced-apart holes 80 with the holes 80a and 80b on side 70a respectively aligned in registry with the holes 80c and 80d on the other side 70b for permitting each pair of aligned holes (i.e., 80a to 80c and 80b to 80d) to receive a stud 90 for permitting the housing 60 to be attached to a plastic portion 100, as will be described in detail below. A metallic housing bottom 110 rests between the sides 70, and is integrally formed with the sides 70 so as to form one solid portion or may attached to the sides 70 at their lower portion by a suitable metallic adhesive. The bottom 110 maintains a width (W) between the two sides 70. Each side 70 contains two spaced-apart, notched-out portions 120 having the same spacing on both sides 70. A metal post 130 is disposed in each notch 120 for attracting the magnets 50a and 50b when they are positioned in the housing 60, as will later become more apparent.

A rectangular-shaped, non-metallic (such as plastic) centerpiece 140 is attached to the housing bottom 110 by a suitable adhesive, and a closed-loop, electrical coil 150 is wound around it for receiving electrical current from a suitable direct current source (not shown), which are well known in the art. The coil 150 includes two lead ends 170 for connection to the current source and passes through a slot 180 in the housing 60 for permitting access to the current source. The coil 150, when energized, creates a magnetic field of which the direction is periodically alternated by reversing the direction of the current; therefore, the current source should include the capability to switch the direction of the current supplied to the coil 150 for permitting this field inversion.

The low friction plastic 100, such as lubricated polycarconate (such as that manufactured by LNP Engineering Plastics Corporation), includes a hollowed-out center portion 190 which receives the magnets 55a and 55b as the plastic portion 100 is placed onto the housing 60. It is instructive to note that the plastic portion 100 is smaller in width (W1) than the width (W) of the housing 60 so the lateral movement is permitted. The plastic portion 100 includes four pockets 200 respectively positioned to correspond to the locations of the four notched-out portions 120 so that when the plastic portion 100 is placed on the housing 60 each notched-out portion 120 and its corresponding pocket 200 forms a generally circular hollowed-out section for receiving a post 130. One end of the plastic portion 100 includes an enlarged portion 210 having a hole 220 therethrough which is in registry with two holes 80b and 80d in the housing 60 for receiving a stud 90b for attaching the housing 60 to the plastic portion 100. The other end includes a T-shaped portion 230 also having a hole 240 therethrough in registry with two holes 80a and 80c in the housing 60 for receiving the other stud 90a for further attaching the housing 60 to the plastic portion 100.

Finally, the magnets 50a and 50b are placed in the hollowed-out portion 190 and are secured thereto by a suitable epoxy (not shown). It is instructive to note that the plastic portion 100 can move translationally on the studs 90a and 90b which, in turn, moves the magnets translationally.

Figure 3:
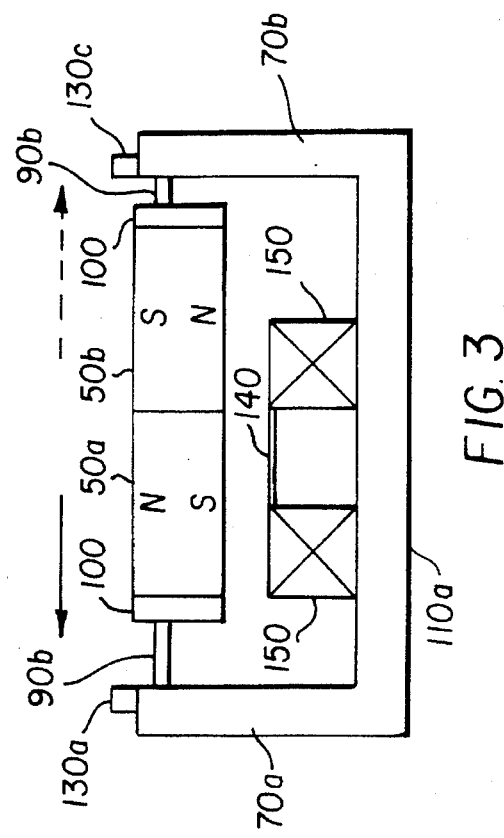
FIG. 3 is a view in vertical cross section of the bias-field device.

Referring to FIG. 3, an illustration of the operation of the bias-field device 40 is shown. The coil 150 is energized to a suitable direct current, typically between 100 and 300 milliamps, for creating a magnetic field. This field causes the magnets 50a and 50b to move by Lorenz force, well known in the art, translationally and laterally and, in turn, to move the plastic portion 100 translationally and laterally until the plastic portion 100 abuts the side 70a for preventing further movement in this direction, as illustrated by the solid arrow. Those skilled in the art will readily recognize which direction the electrical current should flow through the coil for moving the magnets 50 in this direction. The magnet 50a is attracted to the posts 130a and 130b for assisting in rapid lateral movement of the magnet 50a towards the desired side 70a or, in other words, a fast response time.

To move the magnet 50b towards the other side 70b, the direct current is simply reversed in direction. This causes the magnetic field to reverse its direction for causing the magnets 50a and 50b to move translationally and laterally toward the other side 70b, as illustrated by the dashed arrow. It moves in this manner until the plastic portion 100 abuts the side 70b for preventing further movement in this direction. The posts 130c and 130d, similar to the other posts 130a and 130b, attract the magnets 50a and 50b in this direction for a fast response time.

The invention has been described with reference to a preferred embodiment. However, it will be appreciated that variations and modifications can be effected by a person of ordinary skill in the art without departing from the scope of the invention.

Parts List:
10 disk
20 recording layer
30 substrate
35 laser source
40 bias field device
50a magnet
50b magnet
60 housing 70 side
70a side
70b side
80 hole
80a hole
80b hole
80c hole
80d hole
90 stud
90a stud
90b stud
100 plastic
110 housing bottom
120 notch
130 post
130a post
130b post
130c post
130d post
140 centerpiece
150 coil
170 lead ends
180 slot
190 hollowed-out center
200 pockets
210 enlarged portion
220 hole
230 t-shaped portion
240 hole

We claim:

1. A translational, bias-field device for a magneto-optical system having a magneto-optical recording element moving through a first magnetic field created by the bias-field device so that information is selectively recorded on or erased from the recording element, the device comprising:

(a) a housing;

(b) a first rail for enabling translational movement attached to said housing;

(c) a permanent magnet positioned adjacent the recording element for providing the first magnetic field to the recording element, and attached to said first rail which enables translational movement to said magnet when said magnet is induced with a second magnetic field; and (d) a coil positioned adjacent to said magnet which, when energized, imparts the second magnetic field to said permanent magnet.

2. The device as in claim 1 further comprising a second rail positioned in a spaced apart relationship with said first rail, and both said rails disposed substantially parallel to each other and supported by said housing.

3. The device as in claim 2, wherein said magnet is encased with a plastic having low friction characteristics, and said plastic is operatively supported by said rails for providing substantially unrestricted movement of said magnet along said rails.

4. The device as in claim 3, wherein said housing includes a generally U-shaped cross section, and said first and second rails are respectively disposed through opposite ends of said support structure.

5. The device as in claim 4, wherein said housing includes two walls in a substantially parallel, spaced apart relationship, and said rails extend respectively through said walls in a spaced apart, substantially parallel relationship with each other.

6. The device as in claim 5 further comprising two posts respectively disposed in each wall for assisting in providing rapid movement of said magnet along said first and second rails.

* * * * *